United States Patent [19]

Harrigan et al.

[11] Patent Number: 5,212,500
[45] Date of Patent: May 18, 1993

[54] WRITING BEAM FOCUSING UTILIZING LIGHT OF A DIFFERENT WAVELENGTH

[75] Inventors: Michael E. Harrigan, Webster; John F. Carson, W. Henrietta, both of N.Y.

[73] Assignee: Eastman Kodak Company, Rochester, N.Y.

[21] Appl. No.: 670,092

[22] Filed: Mar. 15, 1991

[51] Int. Cl.⁵ ............................................. H04N 1/21
[52] U.S. Cl. ..................................................... 346/108
[58] Field of Search ................. 346/108, 160; 355/53, 355/43

[56] References Cited

U.S. PATENT DOCUMENTS

| | | | |
|---|---|---|---|
| 4,099,208 | 7/1978 | Tasaku et al. | 358/296 |
| 4,283,777 | 8/1981 | Curry et al. | 369/32 |
| 4,502,762 | 3/1985 | Anderson | 350/394 |
| 4,667,316 | 5/1987 | Suda et al. | 369/44 |
| 4,870,452 | 9/1989 | Tanimoto et al. | 355/53 |
| 4,952,815 | 8/1990 | Nishi | 250/548 |

FOREIGN PATENT DOCUMENTS 2-304515 12/1990 Japan .

OTHER PUBLICATIONS

IBM Technical Disclosure Bulletin, vol. 30, No. 8, Jan. 1988, entitled "Focusing Method For Projection Exposure Systems".

Primary Examiner—Mark J. Reinhart
Attorney, Agent, or Firm—Robert L. Randall

[57] ABSTRACT

In an imaging system comprising a source of light movable with respect to a writing element and projectable thereon to generate an image, a focusing means is provided for focusing a light source which generates a first beam of light of a wavelength selected to be actinic with respect to the writing element At least a portion of the first beam of light is absorbed by the writing element. The focusing means includes means for generating a second beam of light which is projectable onto the writing element and has a wavelength different than the wavelength of the first light beam. Means is provided which is responsive to the second beam of light to generate a signal to control the focusing means.

30 Claims, 3 Drawing Sheets

WRITING BEAM FOCUSING UTILIZING LIGHT OF A DIFFERENT WAVELENGTH

BACKGROUND OF THE INVENTION

1. Field of the Invention

The present invention relates to a color proofing apparatus which utilizes an electronic signal input, and more particularly, to a method and apparatus for focusing a writing beam in a thermal printer using lasers to provide thermal energy to a dye-donor which causes the dye to selectively transfer to a receiver to form the proof image.

2. Description of the Prior Art

Color-proofing is the procedure used by the printing industry for creating representative images that replicate the appearance of printed images without the cost and time required to actually set up a high-speed, high--volume printing press to print an example of the images intended. Ideally, these representative images, or proofs, are generated from the same color-separations used to produce the individual color printing plates used in printing presses so that variations in the resulting images can be minimized. Various color-proofing systems have been devised to create the proofs and have included the use of smaller, slower presses as well as means other than presses, such as photographic, electrophotographic, and non-photographic processes The proofs generated are -judged for composition, screening, resolution, color, editing, and other visual content. The closer the proof replicates the final image produced on the printing press, as well as the consistency from image to image, from press to press, and from shop to shop, the better the acceptance of the proofing system by the printing industry Other considerations used in judging proofing systems include reproducibility, cost of the system as well as cost of the individual proofs, speed, and freedom from environmental problems. Further, since nearly all printing presses utilize the half-tone process for forming pictorial images, wherein the original image is screened, i.e. photographed through a screen to produce one or more printing plates containing an image formed of a plurality of fine dots that simulate the varying density of the original image, proofing processes that employ the half-tone process to form an image are more acceptable to the printing industry than are continuous tone systems.

In recent years a variety of processes have been developed and implemented to electronically form, store, and manipulate images both for the actual printing as well as the proofing of images. While such electronic systems can handle and produce analog images, the most widely used systems employ digital processes because of the ease of manipulation of such digital images. In each of these electronic processes it is possible to display the resulting image on a CRT display, but it is generally necessary to produce a "hard copy" (i.e. an image actually formed on a sheet of paper or other material) before it can be fully assessed for approval of the final printing operation. Thus, each of these electronic systems requires the use of some form of output device or printer which can produce a hard copy of the image for actual evaluation. It is to the field of proofing output devices that the present invention is directed.

While purely photographic processes can provide accurate reproductions of images, they do not always replicate the reproduction resulting from printing presses. Further, most photographic processes do not produce half-tone images that can be directly compared to the printed images they are supposed to simulate. Moreover, they are almost universally incapable of reproducing the images on the wide variety of paper or other material that can be run through- a press. It is known that the appearance of the final printed image is affected by the characteristics of the paper or other material upon which it is printed. Thus, the ability to form the proof image on the material actually to be used in the press can be a determining factor in the selection of the proofing system.

Other continuous tone proofing systems, such as thermal processes and ink-jet systems have been developed, but they do not replicate the half-tone images so desired by the printing industry.

Electrophotographic proofing systems with half-tone capability have been introduced over the past few years which employ either wet or dry processes. The electrophotographic systems that use dry processes suffer from the lack of high- resolution necessary for better quality proofing, particularly when the images are almost of continuous tone quality This results from the fact that dry electrophotographic processes cannot employ toner particles which have a sufficiently small size to provide the requisite high image resolution. While wet electrophotographic processes do employ toners with the requisite small particle size, they have other disadvantages such as the use of solvents that are environmentally undesirable.

In commonly assigned U.S. patent application Ser. Nos. 451,655 and 451,656, both filed Dec. 18, 1989, a thermal printer is disclosed which may be adapted for use as a direct digital color proofer with half-tone capabilities. This printer is arranged to form an image on a thermal print medium, or writing element, in which a donor element transfers a dye to a receiver element upon receipt of a sufficient amount of thermal energy. This printer includes a plurality of diode lasers which can be individually modulated to supply energy to selected areas of the medium in accordance with an information signal. The print-head of the printer includes one end of a fiber optic array having a plurality of optical fibers coupled to the diode lasers. The thermal print medium is supported on a rotatable drum, and the print-head with the fiber optic array is movable relative to the drum. The dye is transferred by sublimation to the receiver element as the radiation, transferred from the diode lasers to the donor element by the optical fibers, is converted to thermal energy in the donor element.

A direct digital color proofer utilizing a thermal printer such as that just described must be capable of consistently and accurately writing minipixels at a rate of 1800 dots per inch (dpi) and higher to generate half-tone proofs having a resolution of 150 lines per inch and above, as is necessary to adequately proof high- quality graphic arts images such as those found in high quality magazines and advertisements. Moreover, it is necessary to hold each dot or minipixel to a density tolerance of better than 0.1 density unit from that prescribed in order to avoid visible differences between the original and the proof. This density control must be repeatable from image-to-image and from machine-to-machine. Moreover, this density control must also be maintained in each of the colors being employed in multiple passes through the proofer to generate a full color image.

Aspects of the apparatus which affect the density of the dots that make up the image include such things as variations and randomness of the intensity and frequency of the laser output, and variations in the output of the fiber optics which can vary from fiber to fiber and even within a single fiber as it is moved during the writing process. Variations in the finish of the drum surface as well as drum runout and drum bearing runout and variations in the parallelism of the translation of the print-head with respect to the axis of the drum will also affect the density of the image dots. The difference in the distance between the ends of individual fibers and the drum surface also affects image density because of the fact that the end of the fiber bundle is flat while the surface of the drum is curved. Temperature variations in the print-head due to the ambient temperature of the machine as well as the fact that the writing process itself heats the print-head also influence the image density.

Variations in the print medium elements, such as variations in the thickness of the donor and receiver elements as well as the various layers that are a part thereof, can also affect the image density as it is being written.

Thus, it has been found necessary to continuously focus the writing beam as the image is being formed to assure that variations in the thickness of the donor and receiver elements, as well as other perturbations in the system, do not defocus the writing beam and adversely affect the image density or the sharpness of the image. Attempts have been made to utilize reflections of the writing beam from the top surface of the donor element to affect an autofocus control of the writing beam but variations in the thickness of the donor element itself have led to less than satisfactory results. Attempts to focus the writing beam by sensing the reflection from another surface in the writing element, e.g. the surface of the receiver element, have not been successful because of the strongly absorbing nature of the donor element to the writing beam necessary to generate the heat required to sublimate the dyes to form the image. As a result of the absorbency of the donor element, little or no light remains to be reflected to a focusing device. Further, as each color image is formed, the amount of absorbing material present to mask the receiving element surface from the focusing beam increases Still further, because of the total power being produced by the multi-channel writing array, e.g. 20 channels, each operating at a power level of 200 milliwatts, it is easy to overwhelm any focusing beam reflected from the writing element.

Thus it will be seen that a method and apparatus for constantly, quickly and accurately focusing the writing beam of such a digital proofing apparatus would be technologically desirable and economically advantageous.

SUMMARY OF THE INVENTION

According to one embodiment of the present invention, in an imaging system comprising a source of light-movable with respect to a writing element and projectable thereon to generate an image, a focusing means is provided for focusing a light source which generates a first beam of light of a wavelength selected to be actinic with respect to the writing element At least a portion of the light is absorbed by the writing element. The focusing means includes means for generating a second beam of light which is projectable onto the writing element and has a wavelength different than the wavelength of the first light- beam. Means is provided which is responsive to the second beam of light to generate a signal to control the focusing means.

According to another embodiment of the present invention, in an imaging system utilizing a receiver element upon which an image is written by sublimination of a dye from a donor element under the influence of heat from an optical source, a focusing means is provided for focusing a light source which generates a first beam of light- of a wavelength selected to be actinic with respect to the writing element. The donor and receiver elements are superposed in relatively intimate contact on a rotatable drum member, with the donor having at least a portion which is absorptive of light having wavelengths in the range of 800nm-880nm. The light source generates a light having wavelengths in the range of 800nm-880nm and is movable with respect to said drum member to direct a first beam of light to said donor element where it is at least partially absorbed to transfer dye to said receiver element to generate an image. The light source comprises a plurality of laser diodes and a plurality of optical fibers connecting the diodes to a movable writing head adjacent the drum member. The optical fibers are arranged as a linear array at the writing head. The improvement comprises means for focusing the first beam of light from the linear array with respect to the donor element. The focusing means includes a stationary lens element and a movable lens element along with means for moving the movable lens element. A laser diode is provided for generating a second beam of light having a wavelength outside the range of 800nm-880nm which is directed through the focusing means toward the drum member where at least a portion of the second beam is unabsorbed by the donor element and is reflected from the first surface of the receiver element. The reflected portion of the second beam is directed back through the focusing means to a photocell means disposed adjacent the linear array of optical fibers. The photocell means has a preferential sensitivity to the wavelength of the second beam and is arranged to generate a signal to control the means for moving the movable lens element to maintain the focus of the first beam of light with respect to the donor element.

According to still another embodiment, in an imaging system comprising a source of light movable with respect to a writing element and projectable thereon to generate an image, the source of light is arranged to generate a first beam of light of a wavelength selected to be actinic with respect to the writing element with at least a portion of the light being absorbed by the writing element. The method of focusing the light- source with respect to the writing element includes the step of generating a second beam of light and projecting the second beam onto the writing element wherein the second beam of light has a wavelength different than the wavelength of the first light beam, and the steps of sensing the second beam of light and generating a signal to control the focusing means.

According to yet another embodiment, in an imaging system in which an image is written upon a receiver element by sublimination of a dye from a donor element under the influence of heat from an optical source, the donor and receiver elements are superposed in relatively intimate contact on a rotatable drum member with the donor having at least a portion which is absorptive of light having wavelengths in the range of 800nm-880nm. The light source generates light having wavelengths in the range of 800nm-880nm, which light source is movable with respect to the drum member and is arranged to direct a first beam of light to the donor element where it is at least partially absorbed to transfer dye to the receiver element to generate an image. The light source comprises a plurality of laser diodes and a plurality of optical fibers connecting the diodes to a movable writing head adjacent the drum member. The optical fibers are arranged as a linear array at the writing head. A focusing means is provided including a stationary lens element and a movable lens element, and means for moving the movable lens element. The method of focusing the first beam of light from the linear array with respect to the donor element comprises the steps of generating a second beam of light having a wavelength outside the range of 800nm-880nm and directing the second beam through the focusing means toward the drum member. At least a portion of the second beam which is unabsorbed by the donor element is reflected from the first surface of the receiver element back through the focusing means. The reflected second beam is preferentially sensed by a photocell disposed adjacent the linear array of optical fibers and generating a signal for controlling the means for moving the movable lens element to maintain the focus of the first beam of light with respect to the donor element.

Various means for practicing the invention and other features and advantages thereof will be apparent from the following detailed description of illustrative, preferred embodiments of the invention, reference being made to the accompanying drawings.

DESCRIPTION OF THE PREFERRED EMBODIMENT

Figure 1:
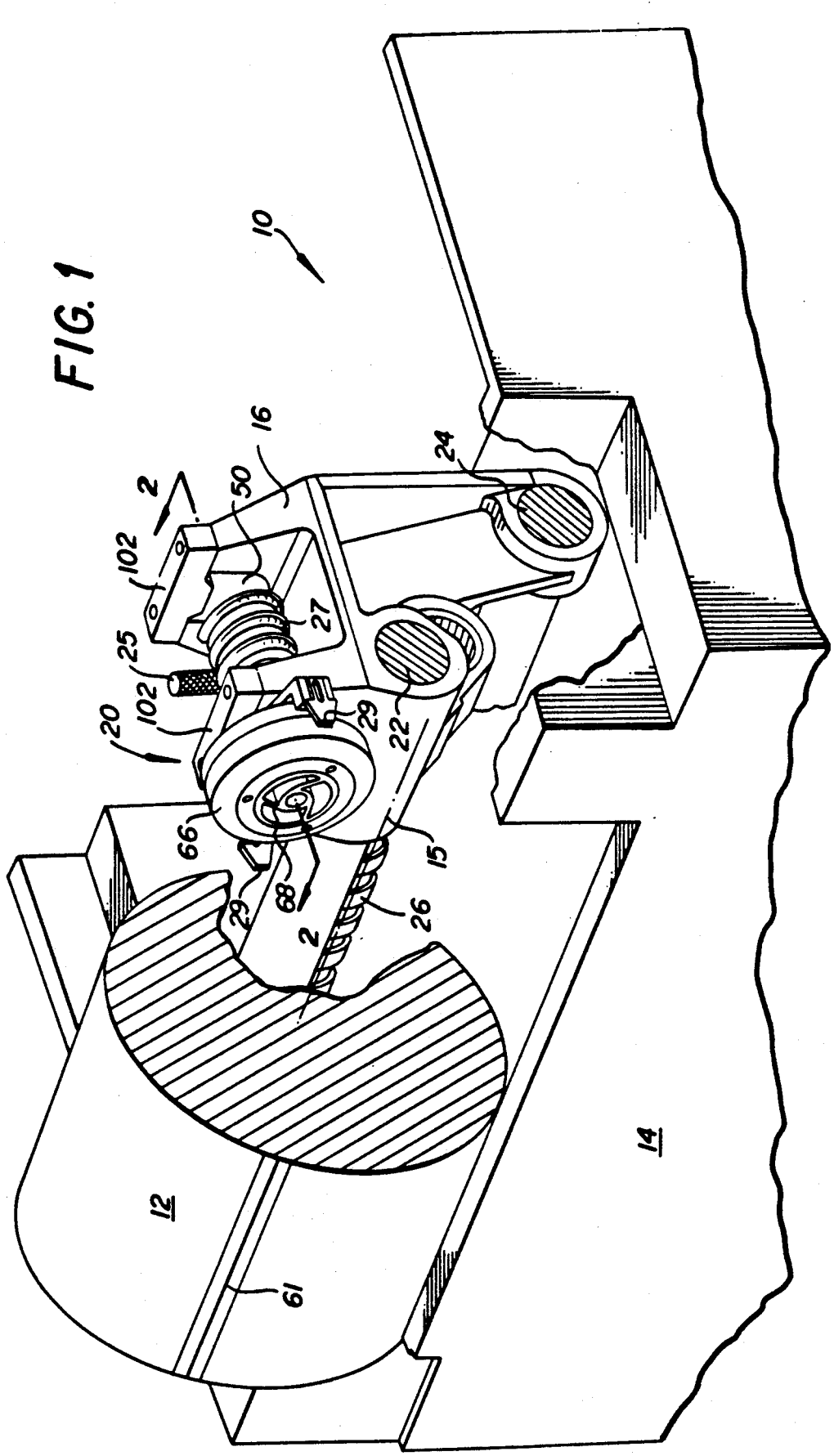
FIG. 1 is a perspective view of the imaging apparatus of the present invention, partially cut-away to reveal hidden portions thereof.

Referring now to FIG. 1, there is shown a thermal printer 10 comprising a drum member 12 mounted for rotation about an axis 15 in frame member 14. The drum member 12 is adapted to support a thermal print medium, not shown, of a type in which a dye is transferred by sublimation from a donor element to a receiver element as a result of heating the dye in the donor. The donor element and the receiver element are superposed in relatively intimate contact and are held onto the peripheral surface of the drum member by means such as by vacuum applied to the superposed elements from the drum interior, A thermal print medium for use with the printer 10 can be, for example, the medium disclosed in U.S. Pat. No. 4,772,582, which includes a donor sheet having a material which strongly absorbs at the wavelength of the exposing light source. When the donor element is irradiated, this absorbing material converts light energy to thermal energy and transfers the heat to the dye in the immediate vicinity, thereby heating the dye to its vaporization temperature for transfer to the receiver element. The absorbing material may be present in a layer beneath the dye, or it may be admixed with the dye and is strongly absorptive to light having wavelengths in the range of 800nm-880nm. An example of a preferred embodiment of a receiver element that can be used with the present invention is disclosed in co-pending, commonly assigned U.S. patent application Ser. No. 606,404, entitled Intermediate Receiver Opaque Support, and filed Oct. 31, 1990. The receiver element disclosed therein incorporates a reflective layer which improves the efficiency of the dye transfer to the receiver element.

The light source is movable with respect to the drum member and is arranged to direct a beam of actinic light to the donor element. Preferably the light source comprises a plurality of laser diodes which can be individually modulated by electronic signals which are representative of the shape and color of the original image, so that each dye is heated to cause volatilization only in those areas in which its presence is required on the receiver to reconstruct the color of the original object. In the preferred embodiment, the laser diodes are mounted remotely from the drum member 12, on the stationary portion of the frame 14, and each direct the light produced thereby to the input end of a respective optical fiber which extends to and transfers the light to a movable writing head 20 adjacent the drum member. The laser diodes are selected to produce a first beam of light having wavelengths in the range of 800nm-880nm, and preferably predominantly at a wavelength of 830nm.

The writing head 20 is moveably supported adjacent drum member 12 and is mounted on a moving translator member 16 which, in turn, is supported for slidable movement on bars 22 and 24. The bars 22 and 24 are sufficiently rigid that they do not sag between the mounting points at their ends and are arranged as exactly parallel with the axis of the drum member as possible. The upper bar 22 is arranged to locate the writing head precisely on the axis of the drum with the axis of the writing head perpendicular to the drum axis. The upper bar 22 locates the translator in the vertical and the horizontal directions with respect to the axis of the drum member. The lower bar 24 locates the translator member only with respect to rotation of the translator about the bar 22 so that there is no over-constraint of the translator which might cause it to bind, chatter, or otherwise impart undesirable vibration to the writing head during the generation of an image. The translator member 16 is driven by means of a motor (not shown) which rotates a lead screw 26 parallel to bars 22 and 24 to move the writing head parallel with the axis of the drum member. The coupling (not shown) which connects the translator member to the lead screw is carefully chosen so that the only force imparted to the translator by the lead screw is parallel to the drum axis.

The writing head 20 is removably mounted on the translator member 16 so that it automatically adopts the preferred orientation with respect to the drum axis note above. The writing head is selectively locatable with respect to the translator and this with respect to the drum surface and axis, with regard to its distance from the drum surface, and with respect to its angular- position about its own axis. Accordingly, a pair of adjustable locating means are provided to accurately locate the writing head with respect to these two axes on the translator member 16. Only one of the adjustable locating means, a micrometer adjustment screw 25, is illustrated, A torsion and compression spring 27 is provided to load the writing head against these locating means.

The end of the writing head 20 adjacent the drum member 12 is provided with a pair of photosensors 29 aimed at the surface of the drum member. The photosensors may each include an infrared source or they may rely on an outside source of light energy. The photosensors are disposed on diametrically opposite sides of the optical axis of the writing head in a fixed relationship thereto.

Figure 2:
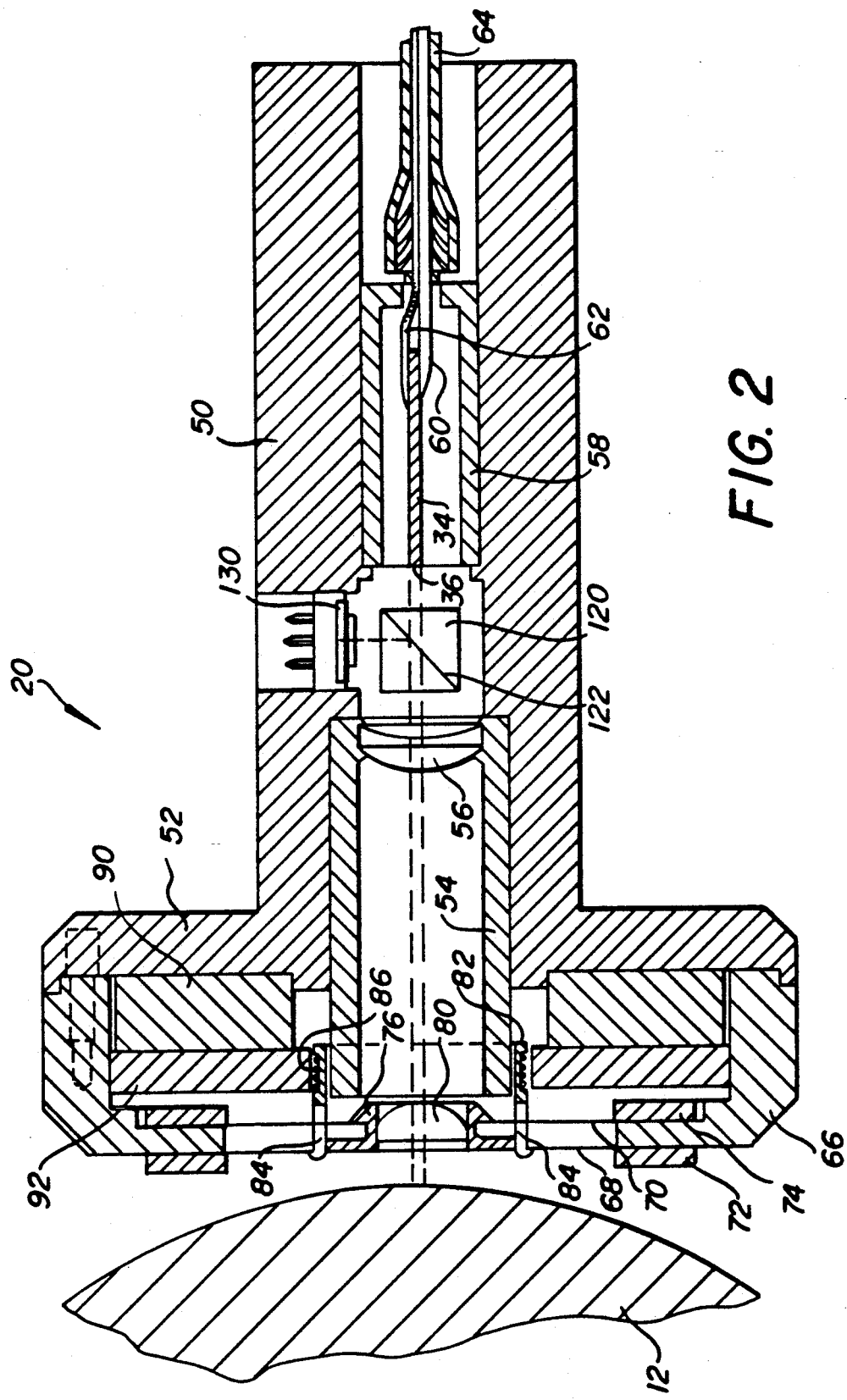
FIG. 2 is a sectional view of the writing head and lens assembly, taken along line 2—2 of FIG. 1.

A cross section of the writing head 20 is illustrated in FIG. 2 and comprises a generally cylindrical barrel portion 50 having a flange 52 at the drum end thereof. The interior of the barrel portion is arranged to accept a stationary lens barrel 54 at the writing end, containing a stationary lens 56. A printhead assembly 58 is selectively oriented within and at the opposite end of the barrel from the writing end. The printhead assembly comprises a tubular member selectively oriented within barrel portion 50 and contains a linear array of optical fibers which includes a fiber-supporting wafer 34 having a plurality of optical fibers 60 mounted thereon. The optical fibers have a writing end 36 facing the drum member 12 at the opposite end of the barrel. The optical fibers 60 extend from the end of the printhead assembly and out of the writing head barrel through a protective sheath 64 to the diode lasers, not shown.

A cup-shaped closure member 66 is arranged to mate with the flange 52 of the writing head barrel 50 and forms a housing for the focusing drive means, as will be described hereinbelow. The end of the closure member adjacent drum member 12 is provided with an axially disposed opening which is bridged by a pair of sheet flexure members 68 and 70, mounted at the outer periphery thereof by annular plate means 72 and 74 to the closure member 66. The central portions of the sheet flexure members are mounted to a movable rigid cylindrical lens housing 76 which contains moveable lens 80. A cylindrical bobbin 82 is disposed around the end of stationary lens barrel 54 and is connected to the moveable lens housing 76 via equally spaced arms 84 which extend between the legs of the flexure members 68 and 70. A voice coil 86 is wound about the cylindrical portion of the bobbin 82 and is connected to a driving circuit, to be further described hereinbelow.

Also enclosed between the end closure 66 and flange 52 is a high power, toroidal magnet 90 and an annular magnetic plate 92 which are both disposed about and spaced from the end of stationary lens barrel 54. The voice coil portion of the bobbin 82 is disposed in the gap between the inner circumference of plate 92 and the outer circumference of stationary lens barrel 54. The dimensions of the magnet, the annular plate, the stationary lens barrel, and the bobbin are such that the bobbin can move freely axially of the lens barrel. The bobbin is supported in the gap by its attachment to the moveable lens housing 76 which is held in position by the plate flexures 68 and 70. It will be noted that the barrel portion 50, flange 52, the stationary lens barrel 54, and annular plate 92, are all formed of magnetic material, such as ordinary steel, so that in combination with the toroidal magnet 90, a strong magnetic field is created between the inner periphery of the annular plate 92 and the end of the stationary lens barrel 54. As a result, when a current is introduced into the voice coil 86 of the bobbin 82, as by a lens focusing circuit (not shown), an axial force is imparted to the bobbin and to the moveable lens housing 76, thereby selectively moving the moveable lens 80 along the optical axis of the assembly. Thus, with an appropriate focus detection system, to be described hereinbelow, the moveable lens assembly may be driven to assure that the output of the fiber optic array is maintained in focus at the appropriate position on the drum member 12, or on or within the writing element (not shown) mounted thereon.

The fiber optic array (see FIGS. 2 and 3) comprises a plurality of fibers 60 which are each connected to a respective, remotely mounted diode laser, not shown. The diode lasers can be individually modulated to selectively project light from the writing end 36 of the optical fibers through the lens assembly, consisting of stationary lens 56 and movable lens 80, onto the thermal print medium carried by the drum member 12. The fiber optic array can be of the type shown in FIG. 3 and comprises optical fibers 60 which are supported on the substrate 34. The array may be of the type shown in co-pending, commonly assigned U.S. application Ser. No. 451,656, filed Dec. 18, 1989. Each of the optical fibers includes a jacket, a cladding, and a core, as is well known in the art As disclosed in the copending application, the fibers extend from the laser diodes to the array and are mounted in sets of grooves 100 (FIG. 4) which are formed in the substrate so that the fibers at the writing end 36 are disposed substantially parallel and adjacent to each other in very close proximity, with the ends disposed in a common plane perpendicular to the fiber axes.

Figure 3:
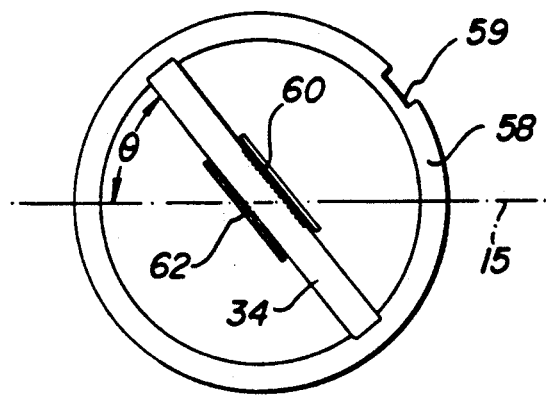
FIG. 3 is an end view of the print head assembly.
Figure 4:
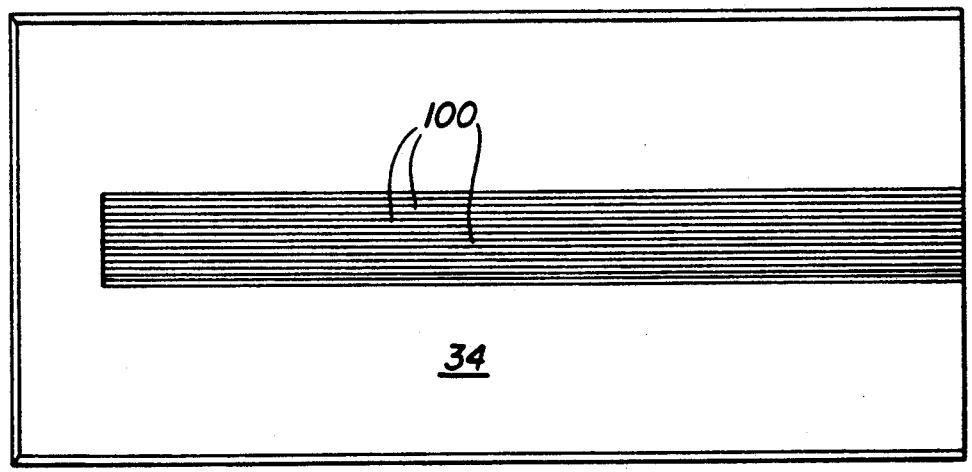
FIG. 4 is a plan view of an optical fiber supporting substrate.

As disclosed in the above co-pending application, the fibers are mounted in the grooves 100 formed in the substrate 34. In a preferred embodiment of the array, twenty writing fibers 60 are employed. As illustrated in FIG. 3, the substrate 34 is disposed in the tubular member of the printhead assembly 58. The tubular member is provided with a keyway 59 which mates with a corresponding key (not shown) on the inner surface of barrel portion 50 so that the orientation of the linear array 60 is at a preselected angle $\Theta$ with respect to the drum axis 15. The orientation of the keyway 59 in the outer surface of the printhead assembly 58, the corresponding key on the interior of the barrel portion 50, and the photosensors 29 disposed on diametrically opposite sides of the writing head axis, all correspond so that when the two photosensors 29 are exactly parallel with the axis 15 of drum member 12, the writing angle of the linear array 60 is that which has been preselected for the present apparatus. The determination of this relationship is relatively simply achieved with the present construction inasmuch as a visible line 61 is provided on the drum surface which is carefully fabricated to be parallel with the drum axis. Accordingly, when the photosensors 29 both detect line 61 simultaneously, the writing head has the proper angular orientation to provide the desired angle of the linear array with respect to the drum axis. Adjustment of the angular positioning of the writing head is equally easy to obtain. Hold down clamps 102, which lock the writing head 20 on the translator member 16, are loosened, and the micrometer adjustment screw 25 is adjusted against a stop on the translator member to rotate the head member against the force of the torsion spring 27, or to permit the torsion spring to rotate the writing head in the opposite direction, should that be necessary. When the photosensors 29 both simultaneously detect line 61, which may be accomplished when the drum is either moving or stationary, with or without the writing element disposed thereon, the desired angle $\Theta$ between the linear array and the drum axis is achieved. With this construction it is possible to replace the writing head in the field with a new writing head without requiring elaborate setup or alignment, since the predetermined relationship has already been established between the photosensors 29 and the linear array when the writing head is assembled.

The focus detection system comprises a second array of optical fibers 62 mounted on the opposite surface of the substrate 34 with respect to the writing array 60. The focusing array 62 requires only a single fiber, but in practice, three fibers may be provided, with two as extras in case the first fiber fails. The focusing fiber is connected at its inlet end to a laser diode (not shown) which may be mounted in the same region with the writing diodes, but which is selected to produce a second beam of light having a wavelength different from the wavelength of the writing beam and preferably outside the range 800nm-880nm. In the preferred embodiment the focusing light source produces a beam of light having a predominant wavelength of 960nm. It has been found that a focusing beam having a wavelength of 960nm is substantially unabsorbed by all of the various donor dye materials. As a result, substantially all of the focusing beam of this wavelength will penetrate the donor material, regardless of the color dye employed, to be reflected from the reflective surface which is part of the receiver element. Inasmuch as this surface has been found to be much closer to the dye layer, where it is desirable to focus the writing beam, than the top surface of the donor layer, it is possible for both the writing beam and the focusing beam to be aimed at more nearly the same surface than is possible if the focusing beam is reflected from the top surface of the donor element. As a result, the writing beam may have less depth of focus and consequently may have a greater numerical aperture which permits the transmission of greater writing power to the writing element than would be the case were the focusing beam and the writing beam to be focused at more widely separated surfaces.

The focus detection system also includes a beam splitter 120, having a semi-reflective buried surface 122, which is disposed between the writing end 36 of the linear array 60 and the stationary lens 56. A split cell photodetector 130 is disposed in the sidewall of barrel 50 and is arranged to receive the portion of the focusing beam which is reflected from the writing element and by the buried layer of the beam splitter. A knife edge is provided between the beam splitter and the photocell and the photocell is provided with a mask to shield it from stray light.

In accordance with the present invention, the focus detection system comprises the laser diode producing a beam of light having a wavelength of 960nm, a focusing optical fiber 62 which is disposed on the opposite of the mounting substrate from the linear array of the writing beam, and which is arranged to project the focusing beam through the beam splitter 120, the focusing assembly comprising lenses 56 and 80, which are illustrated as single lenses but may comprise groups of simple or complex lenses. The focusing beam of light is then projected onto the drum surface or the writing element disposed thereon and is reflected from the reflective surface back through the focusing assembly and into the beam splitter 120 wherein a portion of the reflected focusing beam is deflected by the buried layer past the knife edge onto the split cell photodetector 130. In the preferred embodiment, photodetector 130 has a preferential wavelength sensitivity to the wavelength of the focusing beam, i.e. 960 nm. The signal from the photocell 130 is fed to a focusing circuit, not shown, which then generates an appropriate current which is supplied to the voice coil 86 on the bobbin attached to the movable lens element 80. In this way the focus detection system constantly monitors the location of a surface closely adjacent the surface of the writing element on which the writing beam is to be concentrated.

Alternative Embodiments

While the preferred embodiment sets forth that the focusing beam preferentially has a wavelength of 960nm, it will be appreciated that alternative wavelengths may be chosen. For example, light having wavelengths of 670nm, 1180nm, 1200nm, 1300nm and 1500nm would also operate satisfactorily, so long as they are sufficiently different from the predominate wavelength of the writing beam as to be readily distinguishable therefrom. Moreover, these alternative light beam wavelengths may or may not be relatively unabsorbed by the dye layers, so long as a sufficient amount can be detected at the photodetector to operate the focus detection system, and the absorption of the focusing light is insufficient to transfer dye from the donor to the receiver Still further, it will be appreciated that should a focusing beam having one of the higher wavelengths noted above be used it may be necessary to employ non-silicon photo detectors, e.g., formed from InGaAS or Germanium. If such detectors are used, the differential from the writing beam may be further enhanced.

A further alternative to the preferred embodiment may be found in the surface chosen from which to reflect the focus beam. While the reflective surface of the receiver element is preferred, it is possible to reflect the focus beam from the surface of the drum member, particularly if the receiver element is transparent, or if the drum surface is particularly reflective. Still further, other surfaces of the writing element may be chosen as the surface from which to reflect the focus beam.

Additional variations in the present invention relate to the placement of the photo detector. For example it may be located outside, but adjacent the writing head so that the reflected portion of the focusing beam need not pass through the focusing assembly. Further, it is possible to locate the photodetector behind a transparent surface of the support member so that it responds to the direct impingement of the focusing beam without requiring any reflection thereof.

Accordingly, the present invention provides a method and apparatus for focusing a writing beam for a digital color thermal printer which is not adversely affected by the strongly absorbing nature of the donor element to the writing beam necessary for the generation of heat to sublimate the dyes and form the image. Thus the absorbency of the donor element has little or no effect on the amount of focusing light that can be reflected to a focus detector Further, the increasing amount of imaging light-absorbing dye material on the receiver element with the formation of each color image does not adversely affect the focusing beam Still further, the total power produced by the multi-channel high-power writing array does not overwhelm the sensitivity of the photodetector to the focusing beam reflected from the writing element. Moreover, by using a focusing beam separate from, and with a different wavelength than the writing beam, the focus will be constantly monitored even if no image is being written. Conversely, there need be no concern about exposing the writing element in a non-image area if the focusing beam is non-actinic with respect to the writing element. Additionally, the use of a focus beam of light having a different wavelength than the writing beam permits the optimization of the optic system for both purposes. Thus, the beam splitter can be optimized for the maximum transmission of the writing beam to the writing element and to minimize the amount of the writing beam reflected to the photodetector while maximizing the amount of the focusing beam that is reflected to the photodetector.

The invention has been described in detail with particular reference to a presently preferred embodiment, but it will be understood that variations and modifications can be effected within the spirit and scope of the invention.

What is claimed is:

1. In an imaging system comprising a source of light movable in continuous motion with respect to a writing element and continuously projectable through a lens assembly onto said writing element to generating an image in the writing element, said source generating a first beam of light of a wavelength selected to be actinic with respect to said writing element wherein at least a portion of said light is absorbed by said writing element, means for focusing said light source with respect to said writing element, said focusing means including means for generating a second beam of light projectable through said lens assembly onto said writing element and having a wavelength different that the wavelength of said first light beam, and means responsive to said second beam of light to generate a signal to control said focusing means.

2. An imaging system according to claim 1 wherein said responsive means includes a light sensor which is responsive to the wavelength of said second beam of light.

3. An imaging system according to claim 2 wherein said means responsive to said second beam of light is disposed behind said writing element.

4. An imaging system according to claim 2 wherein said light sensor is disposed adjacent the surface of said writing element upon which said light beams are incident, and including a surface associated with said writing element reflective to said second light beam whereby at least a portion of said second beam is reflected back to said light sensor.

5. An imaging system according to claim 4 wherein said reflective surface is disposed behind said writing element.

6. An imaging system according to claim 4 wherein said reflective surface is disposed in said writing element.

7. An imaging system according to claim 6 wherein said reflective surface is the first surface of said writing element.

8. An imaging system according to claim 6 wherein said reflective surface is a dye layer in said writing element.

9. An imaging system according to claim 2 wherein said light sensor is disposed adjacent the light source, and including a surface associated with said writing element reflective to said second light beam whereby at least a portion of said second beam is reflected back to said light sensor.

10. An imaging system according to claim 9 wherein said reflective surface is disposed behind said writing element.

11. An imaging system according to claim 9 wherein said reflective surface is disposed in said writing element.

12. In an imaging system comprising a source of light movable with respect to a donor element and projectable thereon to generate an image, said source generating a first beam of light of a wavelength selected to be actinic with respect to said donor element wherein at least a portion of said light is absorbed by said donor element, means for focusing said light source with respect to said donor element, said focusing means including means for generating a second beam of light having a wavelength which is substantially unabsorbed by said donor element whereby at least a portion of said second beam passes through said donor element to interact with a second element beyond said donor element to control said focusing means.

13. An imaging system according to claim 12 including means responsive to said second beam of light to generate a signal to control said focusing means.

14. An imaging system according to claim 12 wherein said responsive means includes a light sensor which is preferentially responsive to the wavelength of said second beam of light.

15. An imaging system according to claim 14 wherein said light sensor is disposed adjacent the surface of said donor element upon which said light beams are incident and wherein said second element includes a surface reflective to said second light beam whereby at least a portion of said second beam is reflected back through said donor element to said light sensor.

16. An imaging system according to claim 15 wherein said means responsive to said second beam of light is disposed behind said second element.

17. An imaging system according to claim 15 wherein said second element is an image receiving surface.

18. An imaging system according to claim 14 wherein said light sensor is disposed adjacent the light source, and wherein said second element includes a surface reflective to said second light beam whereby at least a portion of said second beam is reflected back through said donor element o said light sensor.

19. An imaging system according to claim 12 wherein said donor element is absorptive of light having wavelengths in the range of 800nm-880nm.

20. An imaging system according to claim 19 wherein said second light beam has a wavelength outside the range of 800nm-880nm.

21. In an imaging system utilizing a receiver element upon which an image is written by sublimination of a dye from a donor element to a receiver element under the influence of heat from an optical source, said donor and receive elements being superposed in relatively intimate contact on a rotatable drum member, a source of light movable with respect to said drum member and arranged to direct a beam of light to said donor element, said light source comprising a plurality of laser diodes and a plurality of optical fibers connecting said diodes to a movable writing head adjacent said drum member, said optical fibers arranged as a linear array at said writing head, said diodes generating a first beam of light of a wavelength selected to be actinic with respect to said donor element wherein at least a portion of said light is absorbed to transfer dye to said receiver element to generate an image, means for focusing said first beam of light from said linear array with respect to said donor element, said focusing means including a laser diode for generating a second beam of light having a wavelength different from said firs wavelength, at least a portion of said second beam of light being substantially unabsorbed by said donor element whereby said portion of said second beam passes through said donor element to be reflected from a surface of said receiver element, photocell means disposed adjacent said linear array of optical fibers arranged to receive the reflected second beam of light and to generate a signal to control said focusing means.

22. An imaging system according to claim 21 wherein said donor element is absorptive of light having wavelengths in the range of 800nm-880nm.

23. An imaging system according to claim 22 wherein said second light beam has a wavelength outside the range of 800nm-880nm.

24. In an imaging system utilizing a receiver element upon which an image is written from a donor element by a light source, said donor and receiver elements being superposed on a rotatable drum member, said donor having at least a portion which is absorptive of light having wavelengths in the range of 800nm-880nm, said light source generating light having wavelengths in the range of 800nm-880nm, said light source being movable wit respect to said drum member and arranged to direct a first beam of light trough a lens assembly to said donor element where it is at least partially absorbed to continuously transfer an image to said receiver element, said light source being arranged as a linear array adjacent said drum member, mean for focusing said first beam of light with respect of said donor element, said lens assembly including a stationary lens element and a movable lens element, means for moving said movable lens element, means for generating a second beam of light having a wavelength outside the range of 800nm-880nm which is directed through said lens assembly toward said drum member where at least a portion of said second beam is unabsorbed by said donor element and is reflected from said receiver element, said reflected portion of said second beam being directed to a photocell means disposed adjacent said linear array, said photocell means having a preferential sensitivity to the wavelength of said second beam and being arranged to generate a signal to control said means for moving said movable lens element.

25. In an imaging system utilizing a receiver element upon which an image is written by sublimination of a dye from a donor element under the influence of heat from an optical source, said donor and receiver elements being superposed in relatively intimate contact on a rotatable drum member, said donor having at least a portion which is absorptive of light having wavelengths in the range of 800nm-880nm, said light source generating light having wavelengths in the range of 800nm-880nm, said light source being movable with respect to said drum member and arranged to direct a first beam of light- to said donor element where it is at least partially absorbed to transfer dye to said receiver element to generate an image, said light- source comprising a plurality of laser diodes and a plurality of optical fibers connecting said diodes to a movable writing head adjacent said drum member, said optical fibers arranged as a linear array at said writing head, the improvement comprising..

means for focusing said first beam of light from said linear array with respect to said donor element, said focusing means including a stationary lens element and a movable lens element, means for moving said movable lens element, a laser diode for generating a second beam of light having a wavelength outside the range of 800nm-880nm which is directed through said focusing means toward said drum member where at least a portion of said second beam is unabsorbed by said donor element and is reflected from the first surface of said receiver element, said reflected portion of said second beam being directed back through said focusing means to a photocell means disposed adjacent said linear array of optical fibers, said photocell means having a preferential sensitivity to the wavelength of said second beam and being arranged to generate a signal to control said means for moving said movable lens element to maintain the focus of said first beam of light with respect to said donor element.

26. In an imaging system comprising a source of light movable in continuous motion respect to a writing element and continuously projectable through a lens assembly onto said writing element to generate an image, said source generating a first beam of light of a wavelength selected to be actinic with respect to said writing element wherein at least a portion of SAID light is absorbed by said writing element ,and means for focusing said first beam of light, the method of focusing said light source with respect to said writing element including the steps of generating a second beam of light and projecting said second beam through said lens assembly onto said writing element, said second beam of light having a wavelength different than the wavelength of said first light beam, and sensing said second beam of light and generating a signal to control said focusing means.

27. In an imaging system comprising a source of light movable in continuous motion respect to a donor element and continuously projectable through a lens assembly onto said writing element to generate an image, said source generating a first beam of light of a wavelength selected to be actinic with respect to said writing element wherein at least a portion of said light is absorbed by said writing element ,and means for focusing said first beam of light, the method of focusing said light source with respect to said donor element including the steps of generating a second beam of light having a wavelength which is substantially unabsorbed by said donor element, passing at least a portion of said second beam through said lens assembly and through said donor element to interact with a second element beyond said donor element to control said focusing means.

28. An imaging system according to claim 27 wherein said focusing means includes a light sensor disposed adjacent the surface of said donor element upon which said light- beams are incident and wherein said second element includes a surface reflective to said second light beam, including the step of reflecting at least a portion of said second beam back through said donor element to said light sensor.

29. In an imaging system utilizing a receiver element upon which an image is written by sublimination of a dye from a donor element under the influence of heat from an optical source, said donor and receiver elements being superposed in relatively intimate contact on a rotatable drum member, a source of light movable with respect to said drum member and arranged to direct a beam of light to said donor element, said light source comprising a plurality of laser diodes and a plurality of optical fibers connecting said diodes to a movable writing head adjacent said drum member with said optical fibers being arranged as a linear array in said writing head, said diodes generating a first beam of light of a wavelength selected to be actinic with respect to said donor element wherein at least a portion of said light is absorbed to transfer dye to said receiver element to generate an image, and means for focusing said first beam of light, the method of focusing said first beam of light from said linear array with respect to said donor element comprising the steps of generating a second beam of light having a wavelength different from said first wavelength with at least a portion of said second beam of light being substantially unabsorbed by said donor element, passing said portion of said second beam through- said donor element and reflecting said portion from a surface of said receiver element, impinging said reflected portion of said second beam of light on photocell means disposed adjacent said linear array of optical fibers and generating a signal to control said focusing means.

30. In an imaging system utilizing a receiver element upon which an image is written by sublimation of a dye from a donor element under the influence of heat from an optical source, said donor and receiver elements being superposed in relatively intimate contact on a rotatable drum member, said donor having at least a portion which is absorptive of light having wavelengths in the range of 800nm-880nm, said light source generating light having wavelengths in the range of 800nm-880nm, said light source being movable with respect to said drum member and arranged to direct a first beam of light to said donor element where it is at least partially absorbed to transfer dye to said receiver element to generate an image, said light source comprising a plurality of laser diodes and a plurality of optical fibers connecting said diodes to a movable writing head adjacent said drum member, said optical fibers arranged as a linear array at said writing head, focusing means including a stationary lens element and a movable lens element, and means for moving said movable lens element, the method of focusing said first beam of light from said linear array with respect to said donor element, generating a second beam of light having a wavelength outside the range of 800nm-880nm and directing said second beam through said focusing means toward said drum member where at least a portion of said second beam is unabsorbed by said donor element, reflecting said portion of said second beam from the first surface of said receiver element, directing said reflected portion of said second beam back through said focusing means, preferentially sensing said reflected second beam with a photocell disposed adjacent said linear array of optical fibers and having a preferential sensitivity to the wavelength of said second beam, and generating a signal from said photocell for controlling said means for moving said movable lens element to maintain the focus of said first beam of light- with respect to said donor element.

* * * * *

UNITED STATES PATENT AND TRADEMARK OFFICE
CERTIFICATE OF CORRECTION

PATENT NO. : 5,212,500

DATED : May 18, 1993

INVENTOR(S) : Michael E. Harrigan and John F. Carson

It is certified that error appears in the above-indentified patent and that said Letters Patent is hereby corrected as shown below:

Col. 11, line 20, "generating" should be changed to -- generate --

Col. 11, line 30, "that" should be changed to -- than --

Col. 12, line 53, "receive" should be changed to -- receiver --

Col. 13, line 1, "firs" should be changed to -- first --

Col. 13, line 24, "wit" should be changed to -- with --

Col. 13, line 25, "trough" should be changed to -- through --

Col. 13, line 30, "mean" should be changed to -- means --

Col. 14, line 36, after "motion" insert -- with --

Col. 14, line 40, change "writing" to -- donor --

Col. 14, line 42, change "writing" to -- doner --

Signed and Sealed this

Fourth Day of January, 1994

Attest:

*Attesting Officer*

BRUCE LEHMAN

*Commissioner of Patents and Trademarks*